Figure 1:
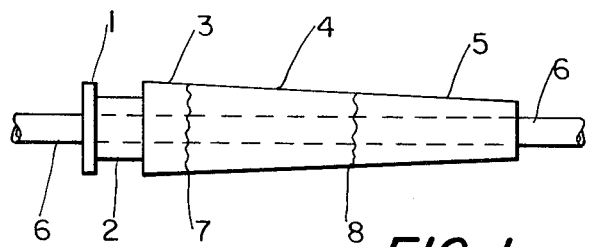

United States Patent [19]

Fariss

[11] Patent Number: 4,461,529

[45] Date of Patent: Jul. 24, 1984

[54] STRAIN RELIEF BOOT

[75] Inventor: James D. Fariss, Wilmington, Del.

[73] Assignee: W. L. Gore & Associates, Inc., Newark, Del.

[21] Appl. No.: 388,957

[22] Filed: Jun. 16, 1982

[51] Int. Cl.³ .................................. H01R 13/56
[52] U.S. Cl. ........................ 339/102 R; 264/260; 264/328.8; 339/218 R
[58] Field of Search ............ 264/247, 260, 277, 328.8, 264/272.2; 425/116; 339/102, 107, 218

[56] References Cited

U.S. PATENT DOCUMENTS

| | | | |
|---|---|---|---|
| 2,226,408 | 12/1940 | Nast | 264/260 X |
| 3,044,127 | 7/1962 | Alden | 264/328.8 X |
| 3,141,054 | 7/1964 | Francis | 339/218 R X |
| 4,052,497 | 10/1977 | Monnet | 264/328.8 X |

FOREIGN PATENT DOCUMENTS 1279871  11/1961  France ........................... 264/328.8

Primary Examiner—Eugene F. Desmond
Attorney, Agent, or Firm—John S. Campbell

[57] ABSTRACT

The disclosure relates to a strain relief boot which, when affixed to an electrical cable and connector, will act in a manner that greatly reduces the stresses transmitted from the cable to the electrical contact, thereby preventing wire breakage and will also be flexible enough so as to allow free movement of said cable when in use so that bending and kinking of the cable does not occur at the cable-boot transition point causing wire breakage. The disclosure is more particularly related to a strain relief boot which may be molded directly onto a prewired electrical connector and cable or as an alternative embodiment may be molded separately for later assembly on the cable and connector at the time they are joined together.

6 Claims, 7 Drawing Figures

STRAIN RELIEF BOOT

BACKGROUND OF THE INVENTION

This invention relates to a strain relief boot which, when affixed to an electrical cable and connector, will act in a manner that greatly reduces the stresses transmitted from the cable to the electrical contact, thereby preventing wire breakage and will also be flexible enough so as to allow free movement of said cable when in use so that bending and kinking of the cable does not occur at the cable-boot transition point causing wire breakage. The invention is more particularly related to a strain relief boot which may be molded directly onto a prewired electrical connector and cable or as an alternative embodiment may be molded separately for later assembly on the cable and connector at the time they are joined together.

It has been a continuing problem to prevent wire and cable motion and stress from being transmitted to the connector pins when the wires are affixed using solder or by crimping methods and allowing the wires to fatigue and break at that point, at the same time maintaining sufficient flex capabilities so as to not inhibit the normal life span of the cable. Many devices designed to avoid this problem rely upon adding complicated or expensive plastic or metal parts to the connector or imbedding compressible metal clamps within the boot which can be tightened around the cable by pressure upon the outside of the boot (such as that disclosed in U.S. Pat. No. 2,774,948). Prior art strain relief techniques rely upon utilizing a boot of uniform hardness that is tapered from the widest portion at the connector end to the narrowest portion at the cable exit end, the hardness of which is selected as a compromise between that hardness needed to mechanically capture the connector and the softness needed near the exit of the boot to provide the flexibility needed for cable motion. This often results in a heavy, long, or bulky device, too soft for adequate mechanical anchoring on the connector regardless of thickness, but not soft enough to provide flexibility even with severe tapering to nearly the diameter of the enclosed cable. This type of tapered boot then fails to adequately grasp the connector body, which allows separation, and/or rigidly holds the cable, which prevents adequate flexure. Inadequate flexure allows the cable to exceed its minimum bend radius, kink and thus cause cable failure. Tapering as a means for providing increasing flexibility to resist sharp bends in the cable is utilized in the varied strain relieving components of the connectors disclosed in U.S. Pat. Nos. 3,961,833; 3,720,906; 3,093,432; 2,954,541; 2,756,402; 2,032,780 and 1,574,020.

Uniformly spaced multiple slots in the body of the strain relief boot, designed to allow more flexibility, have also been used (U.S. Pat. No. 3,093,432). Tooling cost for this boot is extremely high and when transverse torque is placed on the cable, this slotted type boot will often twist to one side or the other to accommodate the combination of compressing and stretching of the various ribs and slots, thereby causing excessive stress on the both boot and cable. The slotted-type strain relief boot, while allowing better flexibility than the more rigid tapered version, still does not accommodate the stress of cable pull. The jacket of the cable is often stretched just behind the boot when the cable is pulled excessively. When the stress is released, the jacket recovers, which allows a bulge to occur at this point, thus weakening the jacket wall and contributing to further cable failure.

A spiral coil slot molded into the boot instead of spaced multiple slots avoids the above problems of uneven stress, but it does not offer the desired gradually increasing resistance to bending of the cable and boot. It is easier to bend the further it is bent away from parallel.

Therefore, the prior art strain relief boots do not completely and satisfactorily solve all the problems inherent in this cable-connector transition area. Not only do the transverse and axial forces applied to the cable and wires it contains need to be transmitted away from the wire-contact junction, but this has to be done while allowing sufficient flexibility so as to not inhibit the normal life span of the cable.

SUMMARY OF THE INVENTION

This invention provides a small solid flex-limiting strain relief boot of gradually diminishing hardness which can be economically affixed by injection molding on or assembly to a connector with one or more attached electrical wires. The wires may be enclosed by a jacket to form a sheathed cable. When properly affixed to the connector-wire transition area, the feature of gradually diminishing hardness provided by this invention uniquely protects the cable, wires, connector, and wire-connector contacts from the damaging stresses of cable motion. In one embodiment, the strain relief boot is molded by an injection molding process directly onto the prewired connector and attached cable. In an alternative embodiment, the strain relief boot is first molded, then assembled onto the electrical connector and cable at the time they are joined together. The boot is then preferably bonded to the cable. Another version of the pre-molded boot is designed for mid-cable flex limitation and allows a cable to be clamped to any fixed surface along its length while maintaining flex protection. All the embodiments of the flex limiting strain relief boot of this invention achieve their unique way of providing strain relief by being molded from a plastic of graduated hardness along the length of the boot, the hardest portion of the boot being that end attached to the electrical connector, with the boot gradually becoming softer toward the opposite end. The connector end is hard enough to mechanically capture the connector, the softer midsection begins the flex mode of the strain relief, and the very soft material at the boot end continues the strain relief and acts as a shock absorber and torque limiter to the cable and its jacket.

Accordingly, it is an object of this invention to provide an improved strain relief and flex limiting boot for use on electrical connectors and clamps and the attached cables to relieve the axial and transverse stresses created at the cable-connector or cable-clamp junction when the cable is pulled or bent.

It is also an object of the invention to provide a strain relief and flex limiting boot of graduated hardness along the length of the boot to effect this improved strain relief and flex limitation.

Another object of the invention is to provide an improved stain relief boot which may either be molded onto a prewired cable and connector or molded in advance, then later assembled on the cable at the time it is joined to the connector.

A further object of the invention is to provide a relatively small strain relief boot of narrow cross-section and light weight, which is especially effective in relieving strain for its size and weight, and is thus economical both of cost and of space occupied.

A still further object of the invention is to provide a strain relief boot which resists cable jacket stretching under stress and thus prevents subsequent buckling and failure of the jacket upon relaxation of the applied stress.

DESCRIPTION OF THE INVENTION

Figure 1A:
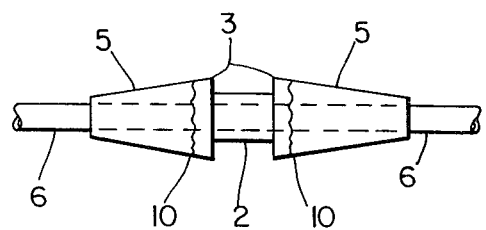
Figure 2:
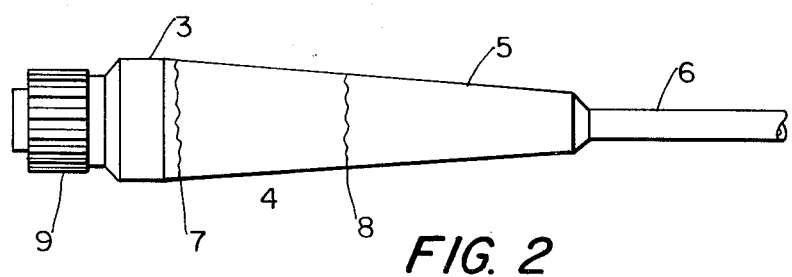
Figure 3:
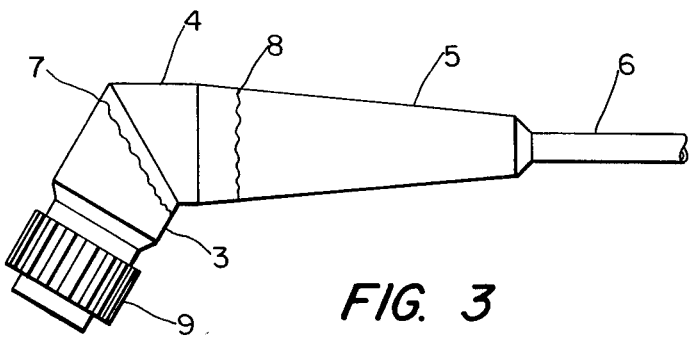

The preferred embodiments of the invention are described by the drawings. FIG. 1 shows a slip-on strain relief boot, which is molded separately in advance of assembly, then slipped over the cable 6, the individual conductors of the cable joined to the connector by standard methods known in the art, an adhesive selected so as to be appropriate for the plastic compositions of the boot and the jacket of the cable applied to the jacket of the cable, and the boot assembled into place on the connector and cable. The shoulder portions 1, 2 and 3 of the boot, where the boot is assembled into a connector, are composed of a hard plastic of approximately 80-95 Durometer A hardness, a rigidity which allows positive capture by the connector body. The middle section 4 of the boot is softer, having a mid to high range Durometer A hardness, in the range of about 55 to about 70. This begins the flex mode of the boot and provides firm control of the bending stress that is applied to the cable or connector. The cable end 5 of the boot is comprised of a soft plastic of Durometer A hardness range of about 40 to 50. This continues the flex mode of the middle section of the boot and serves as a shock absorber and torque limiter for the cable 6 and its jacket or sheath. FIG. 1A illustrates a similar form of boot to that in FIG. 1, a slip-on boot designed for use in mid-cable strain relief and particularly to limit cable flexing, where a cable is attached by a clamp, at 2, to any fixed surface.

The shock absorbing action provided by the gradually increasing softness of the boot is considered to be a unique advantage of the strain relief boot of this invention in that it overcomes the jacket stretching and subsequent buckling when relaxation of stress occurs. The soft cable end section 5 of the boot stretches with the jacket under stress, then aids recovery after stress is relaxed. Therefore, the cable jacket does not buckle or kink just behind the boot. In the absence of this jacket wall degradation, no fulcrum is created, and the minimum bend radius of the cable is not exceeded, thus eliminating the most common cause of cable failure. This is a considerable improvement over the prior art booting techniques where the hardness of the boot is selected as a compromise between the hardness necessary for mechanical capture of the boot by the connector and the degree of softness needed at the cable exit end of the boot for adequate stress relief. This compromise most often leads to either inadequate anchoring of the boot on the connector or insufficient flexing of the boot under stress resulting in cable kinking which leads to ultimate conductor failure or pulling loose of the boot from the connector.

FIGS. 2, 3, 4, and 4A illustrate other preferred embodiments of the invention in which the strain relief boot of the invention is molded directly onto the cable 6 with attached connector 9 by means of plastic injection molding techniques, wherein the plastic composition of the strain relief boot is melted and subsequently forced under pressure into a mold containing the pre-wired connector and cable so that the fluid material completely encloses and surrounds the end of the connector and the cable. After a brief period of time, the pressure is slowly released, the mold opened, and the now solid molded assembly ejected from the mold and cooled.

Figure 4:
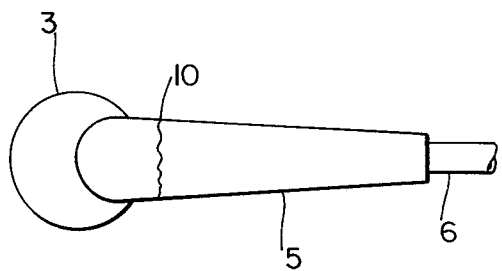
Figure 4A:
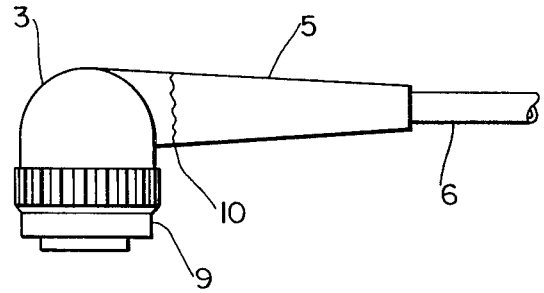

FIG. 4 is a top view of the same embodiment of which FIG. 4A is a side view. The same number in each of the FIGS. 1 through 5 denotes the same or equivalent section or part of the strain relief boot in each figure. 9 may be of any of a number of optional standard connectors known in the art, such as general duty cylindrical type connectors or connectors known as square, rectangular, or in-line types. Other connectors known in the art may be utilized in this invention where they can be captured in the molding process or used with the slip-on embodiment of the invention and the figures thus only illustrate a few selected practical variations of the invention and are not to be construed as limiting thereof. Lines 7, 8 and 10 of the Figures are shown as wavy lines and are intended to mark the approximate surface boundary lines between plastics of differing hardness which are fused together at about these locations during the molding process. These lines 7, 8 and 10 would not ordinarily be visible in the finished strain relief boot and are added to the Figures for convenience of illustation and description only of the composition of the boot and the process of its manufacture.

PROCESS OF MANUFACTURE

A multi-head plastic injection molding machine, which is designed for simultaneous injection of plastics of a variety of hardnesses, is allowed to warm over about 1.5 hours to 185° C. (injection molding machines for use with plastics are described by Eirich, *Rheology*, Vol. 3, Academic Press, N.Y., 1960, on pages 506–51). The pressure in all mold cylinders, three in this instance, is regulated to 50 psig. The 3 cylinders are loaded with 3 plastics (in this example, plasticized polyvinyl chloride) having different Durometer A hardness, the hard plastic in one end cylinder, the softest plastic in the other end cylinder, the plastic of intermediate hardness in the middle cylinder. About 3 minutes is allowed for all plastics to become completely molten within the cylinders.

A cable-connector assembly is then placed in a multi-port injection mold cavity, the two halves of the mold closed, and the mold inserted into place in the mold clamp. The mold clamp is closed by closing the mold clamp switch and a pair of palm buttons are simultaneously depressed in order to start the automatic injection sequence. The palm buttons are held depressed throughout the timed sequence of events. Following a 2-second delay, the plunger of the cylinder which contains the hardest plastic begins to force plastic into the connector end of the mold cavity. After 2 seconds, the plunger of the cylinder containing the plastic of intermediate hardness begins forcing plastic into the mold cavity through a second injection port. 0.5 second later, the plunger of the cylinder containing the softest plastic begins to force plastic into the mold cavity through a third injection port nearest the cable end of the mold cavity. After 4.5 more seconds, the pressure on all three cylinders is released, the timers automatically reset, and the plungers retract from the 3 cylinders. The palm buttons are now released, and the injection mold opened by opening the mold switch. The molded strain relief boot-connector-cable assembly is then removed to cool. The assembly is now ready to be installed.

The mold cylinders may be operated at other temperatures than 185° C., depending upon the composition of the plastic being used to mold the strain relief boot. The preferred range for plasticized polyvinyl chloride, the preferred plastic, is about 180° to about 205° C., the best temperature being readily determinable by simple experimentation and varying somewhat depending on the source or supplier of the polyvinyl chloride, the kind of plasticizers or additives incorporated in the plastic, or from batch to batch of plastic from the same manufacturer. Although plasticized polyvinyl chloride is the preferred plastic used in the strain relief boots of this invention, other injection-moldable plastics may also be used if they can be obtained in a sufficiently wide range of hardness (Durometer hardness of about 40A to about 95A) so as to be useful in the invention. Thermoplastic rubber is known to have about this range of hardness. Other possibly useful materials are found in the group ethylene-propylene-diene monomer, aliphatic epoxy resins cured with a flexible hardener, polyvinyl chloride-vinyl acetate copolymer, certain polyesters, or ethylene-vinyl acetate copolymer.

The pressure within the mold cylinders may be varied considerably within the safety tolerance of the injection molding apparatus. Sufficient pressure is used so as to force molten plastic within the cylinder into the mold at such a rate that complete filling of that portion of the injection mold under the injection port for that cylinder occurs in a short timed interval, following which the second cylinder injects plastic through the second injection port into the mold adjacent to that previously injected into the mold. After a short time interval, the third cylinder injects the remainder of the mold in a like manner and exerts final pressure to insure complete filling of the mold with resulting smooth molded surfaces and lack of voids in the molded strain relief boot.

The timing of the injection sequence can be adjusted to match the size of the volume to be filled, which, along with variation of the injection pressure and temperature and in the hardness of the plastics in the various injection cylinders, allows wide variation in changing the amount and location within the strain relief boot being molded of a plastic of any particularly selected hardness and flexibility.

The injection mold may be temperature-controlled if needed, but heating or cooling of the mold is not needed in this instance where plasticized polyvinyl chloride is being injection molded.

Figure 5:
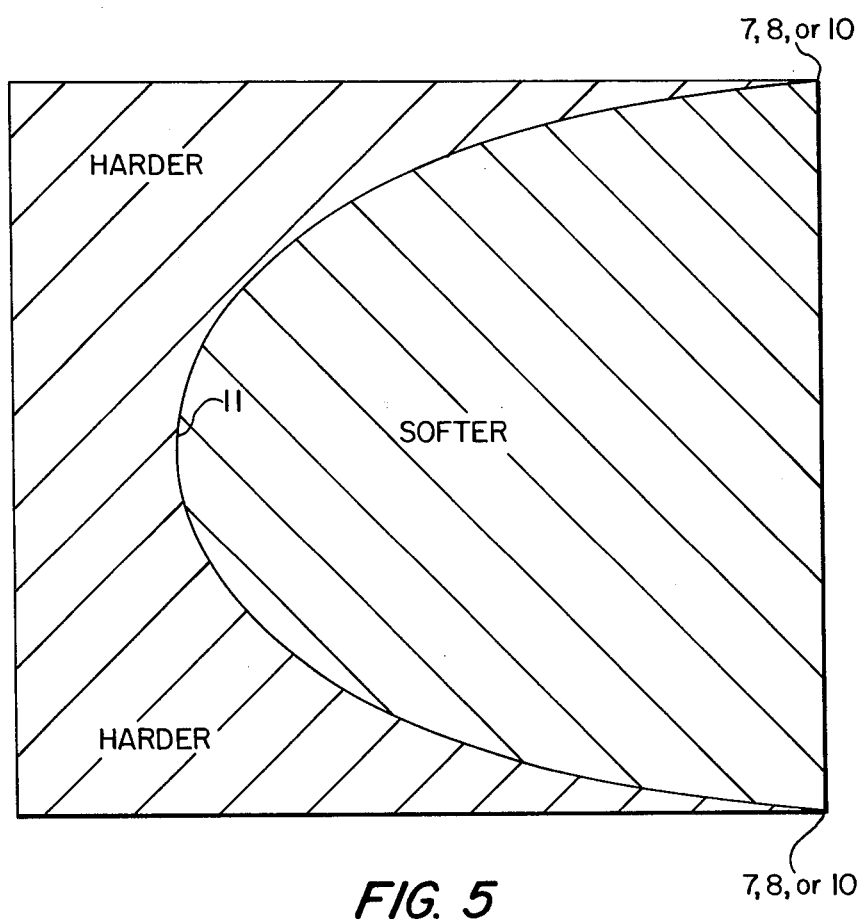

An additional unique and novel feature of this invention and the process by which it is manufactured is illustrated in FIG. 5. It is discovered unexpectedly that when plastics of several different hardnesses are injected simultaneously or almost simultaneously in sequence of hardness, into a mold in the manner disclosed above, that at the interface bond of plastics of two different hardness, the harder material forms a concave surface and the softer material fills this recessed cavity in convex manner. The bonding interface of this convoluted surface between the two materials is thus longer, hence stronger, than just the cross-sectional area of the strain relief boot (line 7, 11, 7 is longer than line 7,7). This observed phenomenon results in the creation of zones of intermediate hardness and flexibility where a cross-section contains plastic of more than one hardness. These zones lie between those zones whose cross-section contain plastic of only one hardness. Thus, the total length of the strain relief boot can be said to be comprised of materials of graduated hardness and flexibility.

For different embodiments of the invention, a differing number of mold cylinders may be utilized in the injection molding machine, such as to manufacture the embodiment illustrated in FIGS. 1A, 4, and 4A, where a boot utilizing 2 plastics of different hardness is illustrated. The boot illustrated in FIGS. 1A and 4A could also be molded alternatively with 3 plastics of differing hardness by utilizing a third mold cylinder in the injection molding machine and a corresponding injection port to the mold. The number and size of mold ports in the injection mold may be varied according to requirements associated with the size and shape of the boot to be molded as well as the number of ports being supplied with molten plastic from any particular mold cylinder to insure smooth void-free molded boots having the intended distribution of plastic of the proper hardness along its length.

In the embodiment of the invention where a slip-on strain relief boot such as those exemplified in FIGS. 1 or 1A is to be assembled onto a cable and connector, an adhesive is used to bond the boot to the jacket of the cable for proper strain relief and to maximize the advantages of the invention. An adhesive is used which will slightly dissolve the surface of both the jacket of the cable and the surface of the strain relief boot to be bonded to it, thereby creating a homogeneous bond between cable and boot. For example, for a strain relief boot molded from plasticized polyvinyl chloride to be assembled on a cable jacketed with a polyurethane sheath, or a polyvinyl chloride sheath, it has been found that tetrahydrofuran, when applied to the cable immediately prior to assembly, will provide a homogeneous bond between the cable and the boot.

In the injection molded embodiments of the invention, the hot molten plastic bonds firmly to the cable jacket and thus tightly grips the sheath and its enclosed conductors for proper strain relief and flex limitation when the cable is flexed or pulled.

What is claimed is:

1. A plastic strain relief boot affixed to an electrical cable and connector in order to transmit transverse and axial forces acting on the cable away from the conductor-connector junction and to limit cable flexing, wherein the hardness of the boot is graduated along the length of the boot, the hardness being greatest adjacent to the connector.

2. A strain relief boot of claim 1 wherein the boot is molded directly onto the connector and the attached cable.

3. A strain relief boot of claim 1 wherein the boot is first formed then assembled onto the cable and connector.

4. A strain relief boot of claim 1 wherein the hardness is graduated from about Durometer 95A adjacent to the connector to about Durometer 40A at the opposite end.

5. A strain relief boot of claim 4 wherein the plastic is plasticized polyvinyl chloride.

6. A strain relief boot of claim 1 wherein the plastic is plasticized polyvinyl chloride.

* * * * *